United States Patent
Upendran (10) Patent No.: US 12,360,963 B1
(45) Date of Patent: Jul. 15, 2025

(54) SYSTEM AND METHOD FOR MANAGING DATA FROM DIFFERENT SOURCES

(71) Applicant: The Toronto-Dominion Bank, Toronto (CA)

(72) Inventor: Rajesh Upendran, Kitchener (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/611,149

(22) Filed: Mar. 20, 2024

(51) Int. Cl.
G06F 16/25 (2019.01)
G06F 11/34 (2006.01)
G06F 16/21 (2019.01)
G06F 21/60 (2013.01)

(52) U.S. Cl.
CPC ........ *G06F 16/213* (2019.01); *G06F 11/3428* (2013.01); *G06F 16/258* (2019.01); *G06F 21/604* (2013.01)

(58) Field of Classification Search
CPC .. G06F 16/213; G06F 16/258; G06F 11/3428; G06F 21/604
See application file for complete search history.

(56) References Cited

U.S. PATENT DOCUMENTS

| | | |
|---|---|---|
| 5,970,490 A | 10/1999 | Morgenstern |
| 5,978,811 A | 11/1999 | Smiley |
| 7,213,037 B2 | 5/2007 | Rangadass |
| 7,313,575 B2 | 12/2007 | Carr et al. |
| 7,383,320 B1 * | 6/2008 | Silberstein ............ G06F 16/958 709/219 |
| 7,673,282 B2 | 3/2010 | Amaru et al. |
| 8,392,530 B1 * | 3/2013 | Manapragada ....... H04L 65/611 348/211.3 |

(Continued)

FOREIGN PATENT DOCUMENTS

| | | |
|---|---|---|
| CN | 114298550 A | 4/2022 |
| EP | 1805645 A4 | 7/2007 |

OTHER PUBLICATIONS

Endris, Kemele M.; Federated Query Processing over Heterogeneous Data Sources in a Semantic Data Lake; Diss. Universitäts-und Landesbibliothek Bonn; Nov. 15, 2019; https://core.ac.uk/download/pdf/322961743.pdf.

*Primary Examiner* — Tarek Chbouki
(74) *Attorney, Agent, or Firm* — CPST Intellectual Property Inc.; Brett J. Slaney (57) ABSTRACT

A system, device and method are provided for managing data from different data sources. The illustrative method includes receiving data files from a plurality of data sources and processing each of the received plurality of data files to detect whether data within a respective data file is associated with one or more data models or a respective downstream model. The method includes processing data associated with the one or more data models to generate first portion of a hybrid data file based on the one or more data models. The method includes processing data associated with the respective downstream model to generate a second portion of a hybrid data file, the respective downstream model defining data other than data associated with one or more data models, the respective downstream model being one of a plurality of downstream models. The model includes combining the first and second portions of the hybrid data file and provide the combined hybrid data file to a related downstream application.

20 Claims, 7 Drawing Sheets

(56) References Cited

U.S. PATENT DOCUMENTS

| | | |
|---|---|---|
| 8,655,711 B2 | 2/2014 | Merrifield, Jr. et al. |
| 8,990,765 B2 | 3/2015 | Kulkarni et al. |
| 10,095,488 B2 | 10/2018 | Ebner et al. |
| 10,430,381 B2 | 10/2019 | Faith et al. |
| 11,397,744 B2 | 7/2022 | Wan et al. |
| 11,720,464 B1 * | 8/2023 | Ezrielev .............. G06F 11/3006 |
| | | 714/47.1 |
| 11,762,869 B1 * | 9/2023 | Werner ................ G06T 11/206 |
| | | 707/722 |
| 11,809,447 B1 * | 11/2023 | Dillman .................. G06F 16/26 |
| 12,130,793 B2 * | 10/2024 | García .................. G06F 16/221 |
| 2012/0324215 A1 * | 12/2012 | Kim .................... G06F 21/6227 |
| | | 713/150 |
| 2021/0342785 A1 * | 11/2021 | Mann .................... G06F 40/186 |
| 2022/0076145 A1 * | 3/2022 | Yalla ...................... G06N 20/00 |
| 2023/0081212 A1 * | 3/2023 | Surendran ............. G06F 16/254 |
| | | 707/736 |
| 2023/0109718 A1 | 4/2023 | Polen et al. |
| 2024/0311654 A1 * | 9/2024 | Samanta ................ G06N 20/00 |
| 2024/0330400 A1 * | 10/2024 | Mahishi .................. G06F 17/18 |
| 2024/0345914 A1 * | 10/2024 | Selvaraj ............. G06F 11/0736 |
| 2024/0348263 A1 * | 10/2024 | Gandhi ............... H03M 7/4006 |

* cited by examiner

SYSTEM AND METHOD FOR MANAGING DATA FROM DIFFERENT SOURCES

TECHNICAL FIELD

The following relates generally to managing data for organizations having a plurality of data sources.

BACKGROUND

Organizations that manage data from a plurality of data sources are faced with challenges managing this data. Each different data source can comply with internal data models, causing difficulties in pooling the data for downstream purposes. The different data sources and their models lead to complexity and roles for managing the data may need to be defined, resources may need to be allocated, and data protection measures may need to be established. These various tasks the related expenditures may need to be tracked and maintained over time, which can be prohibitively expensive and prevent later adjustments to the systems.

Processing large amounts of data from different sources is also challenging. Data from some sources can be time-sensitive or require considerable amounts of processing in order to be integrated. Different downstream applications can have different access to processing resources, introducing additional planning obstacles.

The aforementioned issues multiply when the complexity of downstream applications is considered, particularly in a large organization with a plurality of downstream applications. For example, determining how much data from different data sources needs to be integrated for the application, and how to manage the combination of that data, can be challenging.

Some existing approaches attempt to address some of the shortcomings through centralization. These approaches are challenging as they require detailed knowledge of operations of the plurality of data sources and applications to be enacted. For example, it can be impractical and undesirable for a developer of an application to understand nuances associated with all applicable data sources from which data is required for a downstream application. The centralization approach is also challenging because it undesirably slows application development.

BRIEF DESCRIPTION OF THE DRAWINGS

Embodiments will now be described with reference to the appended drawings wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the term data file is used to denote a collection of data. A data file, as used herein, is not limited to a particular format, or to a particular composition of data, etc. For example, the term data file can include a data file generated by Microsoft™ Excel™ in a .csv format, a JSON file, etc. To repeat for clarity, a data file can have one or more data entries, the entries can be in different formats, can store different types of data (e.g., strings, integers, etc.), etc.

Similarly, the term data model, as used herein, is intended to at least denote a model for defining data entries. The definitions can be established through mappings, such as through a linking table. The definitions can be established through a processing algorithm, which requires data to comply with certain computational steps. The data models can include various additional aspects.

The application is at least in part directed towards an approach for managing data from a plurality of different sources with common data model(s) and customized data model(s). Common data models can define data objects, and common data is exclusively within the common data models purview. Customized data models can be used to define data models for data other than common data. Segregating data models enables different processes to be applied to data simultaneously, and different processes to be applied to update data models within an organization.

The common data models can be updated with a multiple approval process that reflects the wide application of the common data models, whereas customized data models can be updated based on narrow or sole approval of the data owner.

The use of the common data model and the customized data models can enable a hybrid approach to managing data from various data sources. The common data models can be used to define enterprise wide (or multi-unit wide) definitions, exclusively, such that all application developers know to comply with the common data models. Developers have one reference to know when designing an application. Customized data models are used to establish definitions that have lower circulation (e.g., a particular unit). Therefore, developers of customized data models are free to build their models to fit their needs without having to await approval from a centralized authority. In addition, as customized models do not impact common data models, they can be created, updated, and managed by specialized staff without requiring any detailed knowledge of the common data models or the approval process associated with the common data models.

Hybrid data models are generated by the common and customized data models that can be used in downstream applications. Hybridization can be controlled by the extent of the customized data model, and customization can also control the amount of processing and resources required. In one aspect, a system for managing data from different data sources is disclosed. The system includes a processor, a communications module coupled to the processor, and a memory coupled to the processor. The memory stores computer executable instructions that when executed by the processor cause the processor to receive a plurality of data files from a plurality of data sources, and to process each of the received plurality of data files to detect whether data within a respective data file is associated with one or more data models or a respective downstream model. The instructions cause the processor to process data associated with the one or more data models to generate the first portion of a hybrid data file based on the one or more data models. The instructions cause the processor to process data associated with the respective downstream model to generate a second portion of a hybrid data file, the respective downstream model defining data other than data associated with one or more data models, the respective downstream model being one of a plurality of downstream models. The instructions cause the processor to combine the first and second portions of the hybrid data file and provide the combined hybrid data file to a related downstream application.

In another aspect, a method for managing data from different data sources is disclosed. The method includes receiving data files from a plurality of data sources and processing each of the received plurality of data files to detect whether data within a respective data file is associated with one or more data models or a respective downstream model. The method includes processing data associated with the one or more data models to generate the first portion of a hybrid data file based on the one or more data models. The method includes processing data associated with the respective downstream model to generate a second portion of a hybrid data file, the respective downstream model defining data other than data associated with one or more data models, the respective downstream model being one of a plurality of downstream models. The model includes combining the first and second portions of the hybrid data file and providing the combined hybrid data file to a related downstream application.

In another aspect, a non-transitory computer readable medium (CRM) for managing data from different data sources is disclosed. The CRM includes computer executable instructions for performing the above-described method(s).

Figure 1:
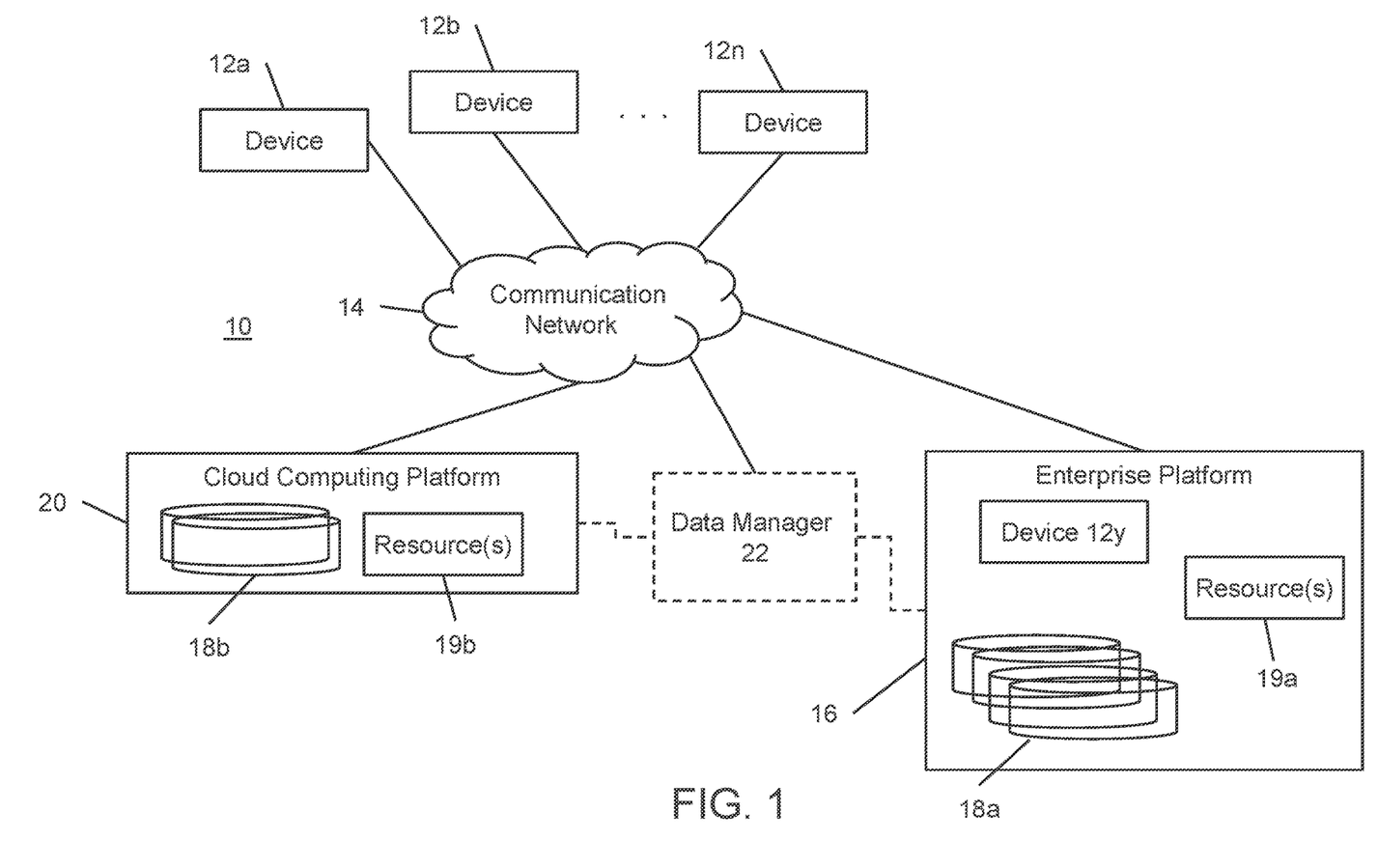
FIG. 1 is a schematic diagram of an example computing environment.

FIG. 1 illustrates an exemplary computing environment 10. The computing environment 10 can include one or more devices 12 for interacting with other components within the environment 10, a communications network 14 connecting one or more components of the computing environment 10, an enterprise platform 16, and a cloud computing platform 20.

The enterprise platform 16 stores, has access to, or at least is responsible for (e.g., stores on behalf of another) data from one or more data source(s). In the shown embodiment, the one or more databases 18a, a type of data source that is contemplated by this disclosure, are shown as a plurality of databases hosted by the enterprise platform 16. It is understood that the term one or more data sources can include instances of data from different databases, or other sources, being stored within a single source (e.g., information provided by different devices 12 can be stored in the same database), or a combination of different data sources and different databases. Data in the database(s) 18a can be provided to the cloud computing platform 20.

The enterprise platform 16 can provide one or more services (e.g., via the example application 170 of FIG. 5) with the data from the one or more data sources. For example, the enterprise platform 16 can be a platform of a financial institution such as commercial bank and/or lender, providing various services such as commercial and personal banking, lending, etc. The one or more services can be provided by one or more devices 12y of the platform 16, and/or one or more computing resources 19a (e.g., a mainframe) of the platform 16, etc. For example, the enterprise platform 16 can provide a plurality of services via a plurality of enterprise resources (e.g., various instances of the shown databases 18a, and/or computing resources 19a). While several details of the enterprise platform 16 have been omitted for clarity of illustration, reference will be made to FIG. 4 below for additional details.

The data of the one or more data sources that the enterprise platform 16 is responsible for can include at least some common data. Common data can be data that is associated with objective physical phenomena, a reference that is immutable, assessment criteria, or designated common data. The common data can include information grounded in objective physical phenomena, such as a location (e.g., all physical location entries can be expressed in a common format (e.g., longitude, latitude, based on municipal records, postal records, etc.)). With respect to immutable references, the data entries in a plurality of data files can all include properties immutable (or almost immutable) to a person (whether legal or otherwise), such as the name of a customer (e.g., a banking division and a marketing division can rely on the same customer's name), government issued identification numbers, etc. With respect to assessment criteria, the common data can include some measure of operational or financial assessment (e.g., a KPI, cost metrics, profit metrics, monthly reports, etc.). The designated common data can be common data that the one or more data sources include because of propagated rules or practices. For example, designated common data can include labelling a particular product with a project codename. The data can include sensitive data (e.g., financial data, customer data, etc.), data that is not sensitive, or a combination of the two.

The enterprise platform 16 includes resources 19a to provide services to customers, to facilitate business operations, to facilitate transferring data from the databases 18a to the cloud platform 20, etc. For example, the enterprise platform 16 can include a communications module (e.g., module 122 of FIG. 4) to facilitate communication with the data manager 22 or cloud computing platform 20.

The cloud computing platform 20, similar to the enterprise system 16, includes one or more instances of a data source, such as the shown database(s) 18b. These data sources can, for example, be for receiving and storing data, for storing generated data sets, models, etc. The data source(s) of the cloud computing platform 20 can be similar to the one or more data sources of the enterprise system 16 or can be separately configured. Hereinafter, for ease of reference, the term plurality of data sources will be used to reference various combinations of the data sources. For example, the term plurality of data sources can include a single database 18b storing data from multiple data sources (e.g., devices 12), or a combination at least in part of a database(s) 18a and/or a database(s) 18b and/or device 12, etc. In another example, the plurality of data sources can denote different data maintained in 'sources' by different units of the enterprise (e.g., a line of business, or a subdivision, or a functionality, such as human resources).

Resources 19b of the cloud computing platform 20 can facilitate the creation of and storage of data, data models and generated data files, the application of one or more tools (e.g., transformation or modelling tools) to stored data, the training of models (machine learning or otherwise), etc. Hereinafter, for ease of reference, the resources 18, 19, of the respective platform 16 or 20 shall be referred to as computing resources, unless otherwise indicated.

Devices 12 may be associated with one or more users. Users can include customers, employees, clients, investors, depositors, correspondents, or other entities that interact with the enterprise platform 16 and/or cloud computing platform 20 (directly or indirectly). The computing environment 10 may include multiple devices 12, each device 12 being associated with a separate user or being associated with one or more users. The devices can be external to the enterprise system (e.g., the shown devices 12a, 12b, to 12n, which can provide data to populate the plurality of data sources, etc.), or internal to the enterprise platform 16 (e.g., the shown device 12y, which can be controlled by a data scientist of the enterprise, or used to populate the plurality of data sources, etc.). In certain embodiments, a user may operate a device 12 such that the device 12 performs one or more processes consistent with the disclosed embodiments. For example, the user may use a device 12 to request that certain data be uploaded, that certain data is processed with a common data model, to update a common or downstream data model, to request data from a data manager 22 to use for downstream applications, etc.

Devices 12 can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect several types of devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

The cloud computing platform 20 and/or enterprise platform 16 may also include a cryptographic module (e.g., cryptographic module 163 of FIG. 5) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the cloud computing platform 20 and enterprise platform 16. The cryptographic server may, for example, be used to protect any data of the enterprise platform 16, such as when in transit to the cloud computing platform 20, or within the cloud computing platform 20 (e.g., data such as financial data and/or client data and/or transaction data within the enterprise) by way of encryption for data protection, digital signatures or message digests for data integrity, and by using digital certificates to authenticate the identity of the users and devices 12 with which the enterprise platform 16 and/or cloud computing platform 20 communicates with (e.g., requests). It can be appreciated that various cryptographic mechanisms and protocols can be chosen and implemented to suit the constraints and requirements of the particular deployment of the cloud computing platform 20 or enterprise platform 16 as is known in the art.

The environment 10 can include a data manager 22 for managing the data from the plurality of data sources of the enterprise platform 16 and/or the cloud computing platform 20. The data manager 22 can have a variety of aspects, including but not limited to storing and creating common data models, listing tables, customized data models. Common data models can be used to convert data in a first format into data in a "common" format. For example, the common data model can be used to define a customer's first name data object, including specifying the required labelling (e.g., CUST_FIRST_NAME), data type (e.g., string), etc. The common data model can, continuing the example, specify how a middle name is stored, and may define how to interrelate certain related common data, such as a first and last name data object. In another example, the common data model can define how a cost center related metric is determined. For example, a cost metric can be defined to include allocations of employee expenses for operations that house employees on other than a permanent basis, capital expenditure assignment rules, etc. Similarly, the common data model can define assessment metrics such as profit metrics, with rules defining how revenue generated by an individual is allocated among business groups, etc.

The common data models can specify other key performance indicators (KPIs), which can, for example, relate to productivity metrics. For example, the common data model can define loan applications processed for a division, define call center productivity measurements, etc. By using common data models to define KPIs, KPI comparison can be more accurate, or can increase certainty of expectations once the measurement methodology is known.

Listing tables 23 of the data manager 22 can include mappings to convert data found within a data source to definitions in the common data model. The listing tables 23 can be organized according to data source, data format, or the contents of a data entry. For example, a listing table can specify labelling used by a first data source (e.g., credit division) of the plurality of data sources to denote customer names (e.g., "f name," "l name", etc.), and the listing table can specify the format that the data entries are stored in (e.g., varchar(30)). The listing table can specify mapping of the data entries to the common data model. For example, in the instance where the common data model specifies a separate entry for a middle name, but the data source stores a middle name after the first name, the listing table can include a mapping defining that the first name entry from the data source needs to be split to comply with the common data model. In at least some example embodiments, the listing tables are integral to the common data model. The listing table(s) can specify mappings between commonly used date and time formats. The listing table(s)

Customized data models of the data manager 22 define data objects used for downstream applications and are alternatively referred to as downstream data models. The customized data models can define data objects for specific applications or sub-entities within the enterprise. For example, the customized data models can specify a data format for data, one or more processing definitions (e.g., similar to the common data model for assessment metrics), etc., that meets the needs of a retail banking division of the enterprise. In another example, a customized data model can be used by a sub-entity of the enterprise to generate monthly sales reports in a fashion preferred by that entity, etc.

The data manager 22 can include a plurality of customized data models for a plurality of different downstream applications. For example, a first customized data model can be used for a retail banking division, a second customized data model can be used for the loan department, another customized data model can be used for the mortgage department, etc.

The data manager 22 can also include an access control module (not shown), which manages authorizations for the common data models, and/or the customized data models, and/or the listing tables. Access to the common data models can be controlled so that no single data steward of a data source can implement changes independently. In this way, the common data models can only be changed with some amount of consensus between the various data owners. This can ensure that technical staff such as data scientists are consulted prior to data being changed with potential enterprise-wide ramifications. Access to the customized data models can be, comparatively, less restricted. The customized data models can have access and read/write permissions that allow a single data owner to change the customized data model, for example, where the customized model only accesses data from the data source(s) owned by the single data owner. By giving less restrictive access to the customized data models, the disclosure contemplates scenarios where centralized approval is not required for data models with more limited applicability, democratizing the process of data management.

Unlike prior approaches which include customized models that were built on common data models, the customized models as described herein function alongside the common data models. That is, the customized data models can be used to adjust or generate entries that are not impacted by the changes or generations performed by the common data models. For example, customized data models may be generated to be completely independent of the common data model and assume that the common data model has complete control over data entries within its purview.

It can be appreciated that while the data manager 22, cloud computing platform 20 and enterprise platform 16 are shown as separate entities in FIG. 1, they may also be utilized at the direction of a single party. For example, the cloud computing platform 20 can be a service provider to the enterprise platform 16, such that resources of the cloud computing platform 20 are provided for the benefit of the enterprise platform 16. Similarly, the data manager 22 can originate within the enterprise platform 16, as part of the cloud computing platform 20, or as a standalone system provided by a third party.

Figure 2:
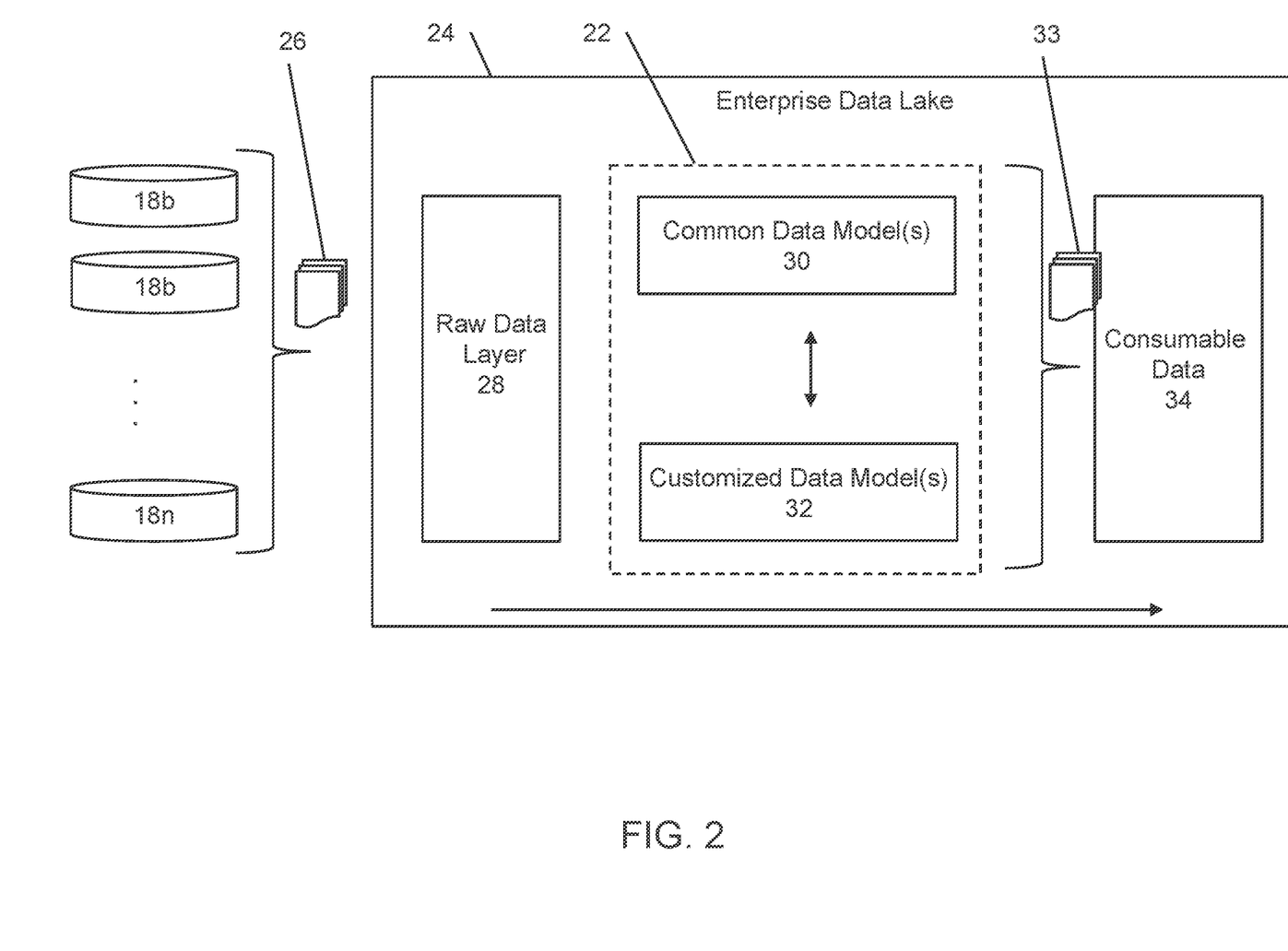
FIG. 2 shows a block diagram of a workflow that incorporates an example data manager 22.

Referring now to FIG. 2, a block diagram of a workflow that incorporates an example data manager 22 is shown.

As shown in FIG. 2, a plurality of data files 26 (hereinafter referred to in the singular, for ease of reference) from the plurality of data sources (shown as data bases 18a, 18b . . . 18n, although, as stated above, the plurality of data sources can include data from a single database 18), is ingested into a remote computing environment platform 24 (hereinafter referred to as a platform 24, for ease of reference). The data file 26 can include a variety of differently formatted data complying with different source schemas.

The ingested data can be hosted or allocated to a raw data layer 28 within the platform 24. For example, the raw data layer 28 can be used as a staging zone before further directing data towards a destination.

Data within the raw data layer 28 can be processed based on the models of the data manager 22. More particularly, the data file 26 in the raw data layer 28 can be processed to determine whether any of the data is associated with the common data model(s) 30 (hereinafter referred to the singular, for ease of reference) or the customized data model(s) 32 (hereinafter referred to the singular, for ease of reference). For example, a data file 26 can include metadata that denotes the source of the data file 26, and a listing table of the common data model 30 can be used to determine the presence of any common data. The data file 26 can be processed by data manager 22 that implements processing algorithms to determine whether any date and time formatted data exists, and this data can be adjusted to comply with the common data model. In another example, the common data model 30 can also specify that all data entries having a particular length of numbers that start with a particular sequence are to be presumed to be account numbers, which are sensitive information, and specify a required output of that data (e.g., masked).

The data file 26 can be processed to determine whether the customized data model 32 is associated with data entries within the data file 26. For example, the data file 26 can be named according to a naming convention (e.g., monthly report NYC) that can be used to determine the applicability of the customized data model 32 defining credit risk profiles, etc. The data file 26 can be processed to determine whether the customized data model 32 applies by using listing tables, similar to the listing tables discussed in relation to the common data model 30.

If the data file 26 contains data applicable to at least one of the data models 30, 32, the platform 24 (or other computing resources) can be used to process the data file 26 to generate a hybrid data file 33. The data file 26 can be processed in sequence, such that the relevant data entries are adjusted with, or used to generate, entries that comply with the common data model 30, and data entries relevant to the customized models 32 are adjusted to comply with, or used to generate, entries that comply with the customized data model 32. The data file 26, or different portions of the data file 26, can be processed simultaneously to adjust, or generate entries that comply with one or more the common data models 30, or one or more customized data models 32, or one or more of the data models 30 and/or one or more customized data models 32. The adjusted/generated entries are used to populate the hybrid data files 33. For example, if the common data model 30 is applicable, portions of the data file 26 responsive thereto can be adjusted, while other portions can be used to complete the hybrid data file without further processing or can be at least in part processed with applicable customized data models 32 (if applicable).

Completed hybrid data files 33 can be hosted in a consumable data layer 34. Various downstream applications can have access to the consumable data layer 34 and can be configured to seek and retrieve hybrid data files 33. The downstream applications can seek hybrid data files 33 based on a source of data, on the basis of an applied model, etc.

Figure 3:
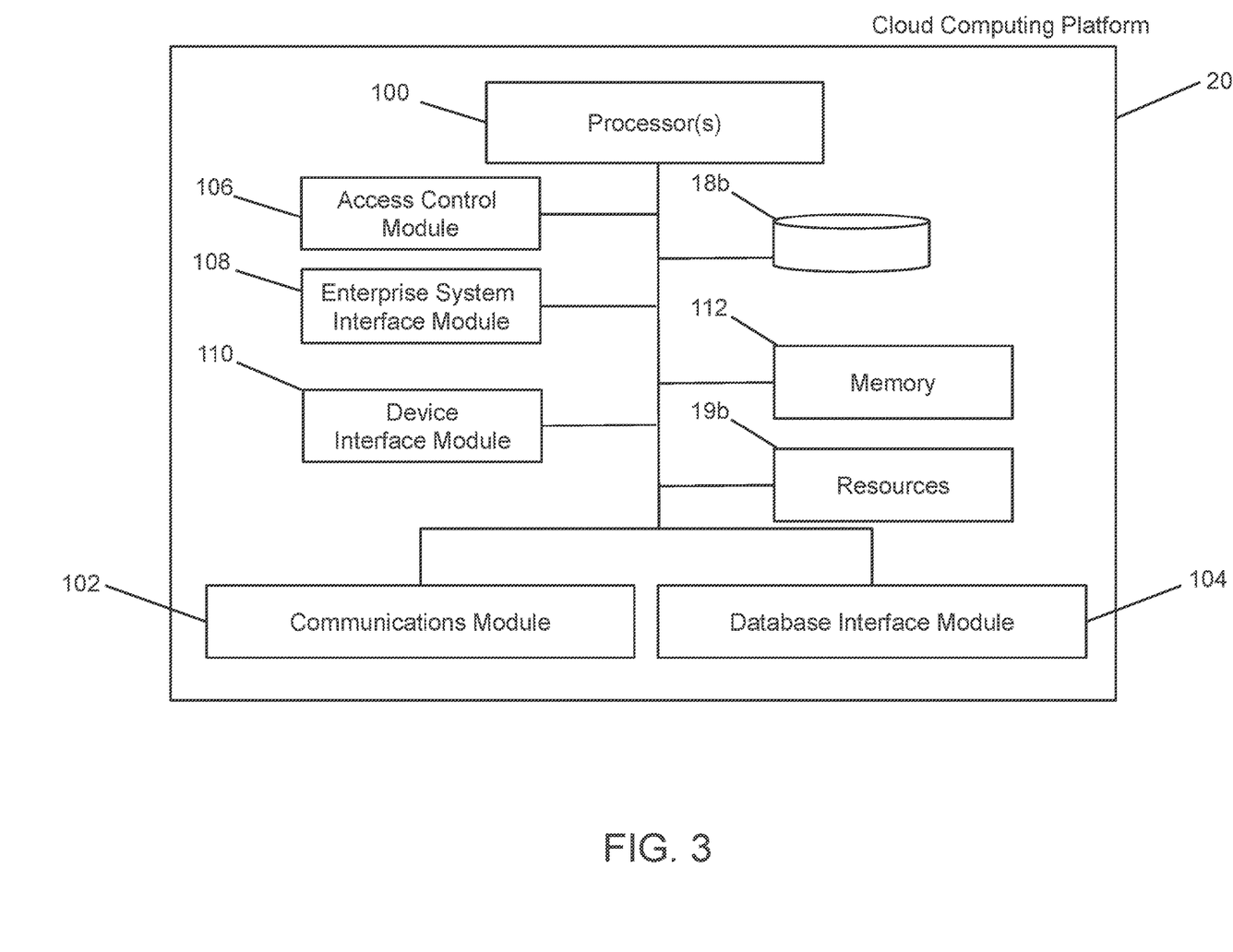
FIG. 3 shows a block diagram of an example configuration of a cloud computing platform.

Referring now to FIG. 3, a block diagram of an example configuration of a cloud computing platform 20 is shown. FIG. 3 illustrates examples of modules, tools and engines stored in memory 112 on the cloud computing platform 20 and operated or executed by the processor 100. It can be appreciated that any of the modules, tools, and engines shown in FIG. 3 may also be hosted externally and be available to another instance of the cloud computing platform 20, or on another cloud computing platform, e.g., via the communications module 102.

In the example embodiment shown in FIG. 3, the cloud computing platform 20 includes an access control module 106, an enterprise system interface module 108, a device interface module 110, and a database interface module 104. The access control module 106 may be used to apply a hierarchy of permission levels or otherwise apply predetermined criteria to determine what aspects of the cloud computing platform 20 can be accessed by devices 12, what resources 18b, 19b, the platform 20 can provide access to, and/or how related data can be shared with which entity in the computing environment 10. For example, the cloud computing platform 20 may grant certain employees of the enterprise platform 16 access to only the common data models 30, but not other data stewards. In another example, the access control module 106 can be used to control which users are permitted to introduce new customized data models 32, or change access permissions to those models, or to change access and other permissions to data in either of the raw data layer 28 or the consumable data layer 34. As such, the access control module 106 can be used to control the sharing of resources 18b, 19b or aspects of the platform 20 based on a type of client/user, a permission or preference, or any other restriction imposed by the enterprise platform 16, the computing environment 10, or application in which the cloud computing platform 20 is used.

The enterprise system interface module 108 can provide a graphical user interface (GUI), software development kit (SDK) or application programming interface (API) connectivity to communicate with the enterprise platform 16. It can be appreciated that the enterprise system interface module 108 may also provide a web browser-based interface (e.g., employees of the enterprise platform 16 can access cloud resources via their personal devices 12), an application or "app" interface, a machine language interface, etc. Similarly, the device interface module 110 can provide a GUI, SDK or API connectivity to communicate with devices 12. The database interface module 104 can facilitate direct communication with database 18a, or other instances of database 18 stored on other locations of the enterprise platform 16.

Figure 4:
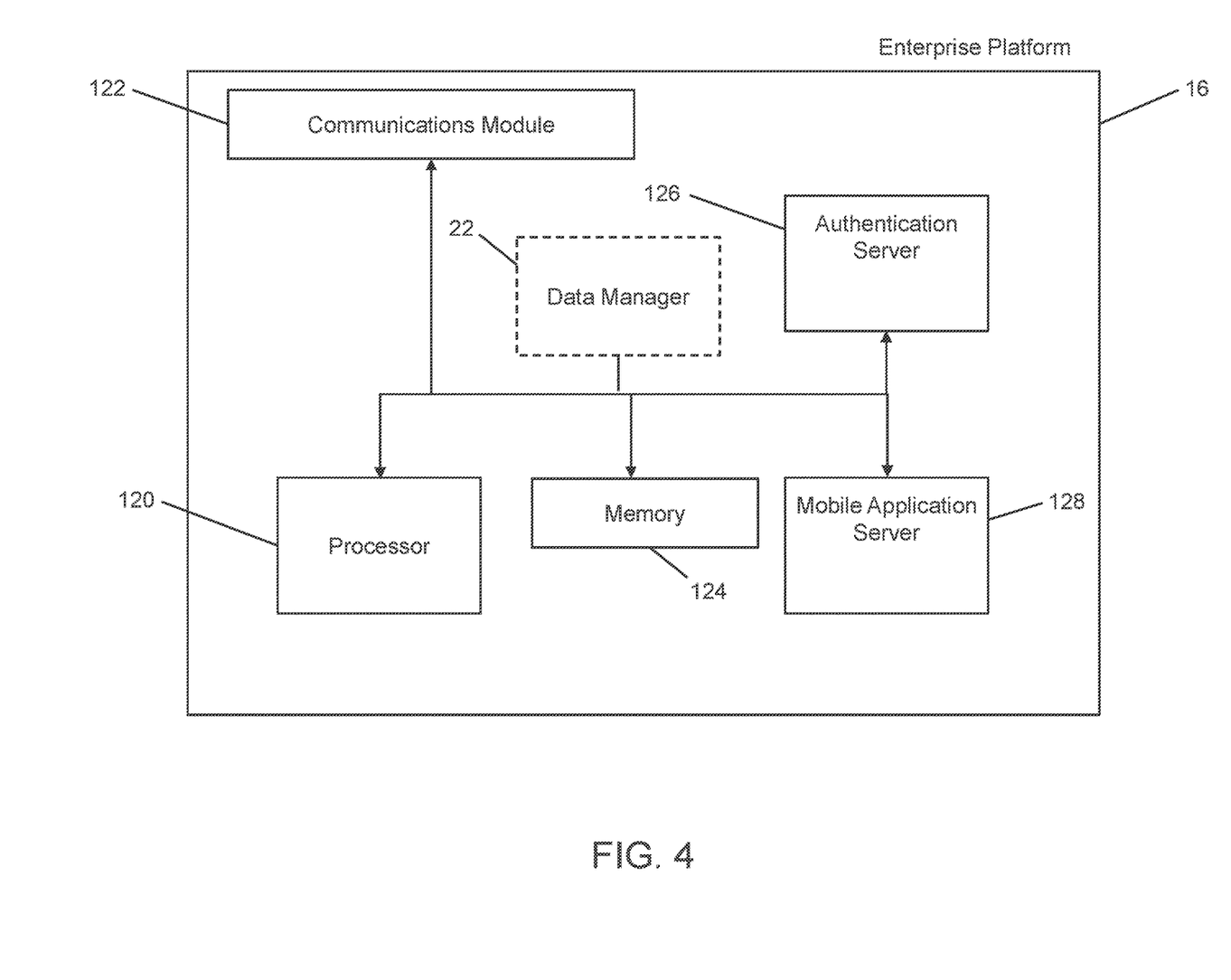
FIG. 4 shows a block diagram of an example configuration of an enterprise platform.

In FIG. 4, an example configuration for an enterprise platform 16 is shown. In certain embodiments, similar to the cloud computing platform 20, the enterprise platform 16 may include one or more processors 120, a communications module 122, and a database interface module (not shown) for interfacing with the remote or local datastores to, e.g., retrieve, modify, and store (e.g., add) data to the resources 18a, 19a. Communications module 122 enables the enterprise platform 16 to communicate with one or more other components of the computing environment 10, such as the cloud computing platform 20 (or one of its components), via a bus or other communication network, such as the communication network 14. The enterprise platform 16 can include at least one memory or memory device 124 that can include a tangible and non-transitory computer-readable medium having stored therein computer programs, sets of instructions, code, or data to be executed by processor 120. FIG. 4 illustrates examples of modules, tools and engines stored in memory on the enterprise platform 16 and operated or executed by the processor 120. It can be appreciated that any of the modules, tools, and engines shown in FIG. 4 may also be hosted externally and be available to the enterprise platform 16, e.g., via the communications module 122. In the example embodiment shown in FIG. 4, the enterprise platform 16 includes at least part of the data manager 22 (e.g., to facilitate data management), an authentication server 126, for authenticating users to access resources 18a, 19a, of the enterprise, and a mobile application server 128 to facilitate a mobile application that can be deployed on mobile devices 12. The enterprise platform 16 can include an access control module (not shown), similar to the cloud computing platform 20.

Figure 5:
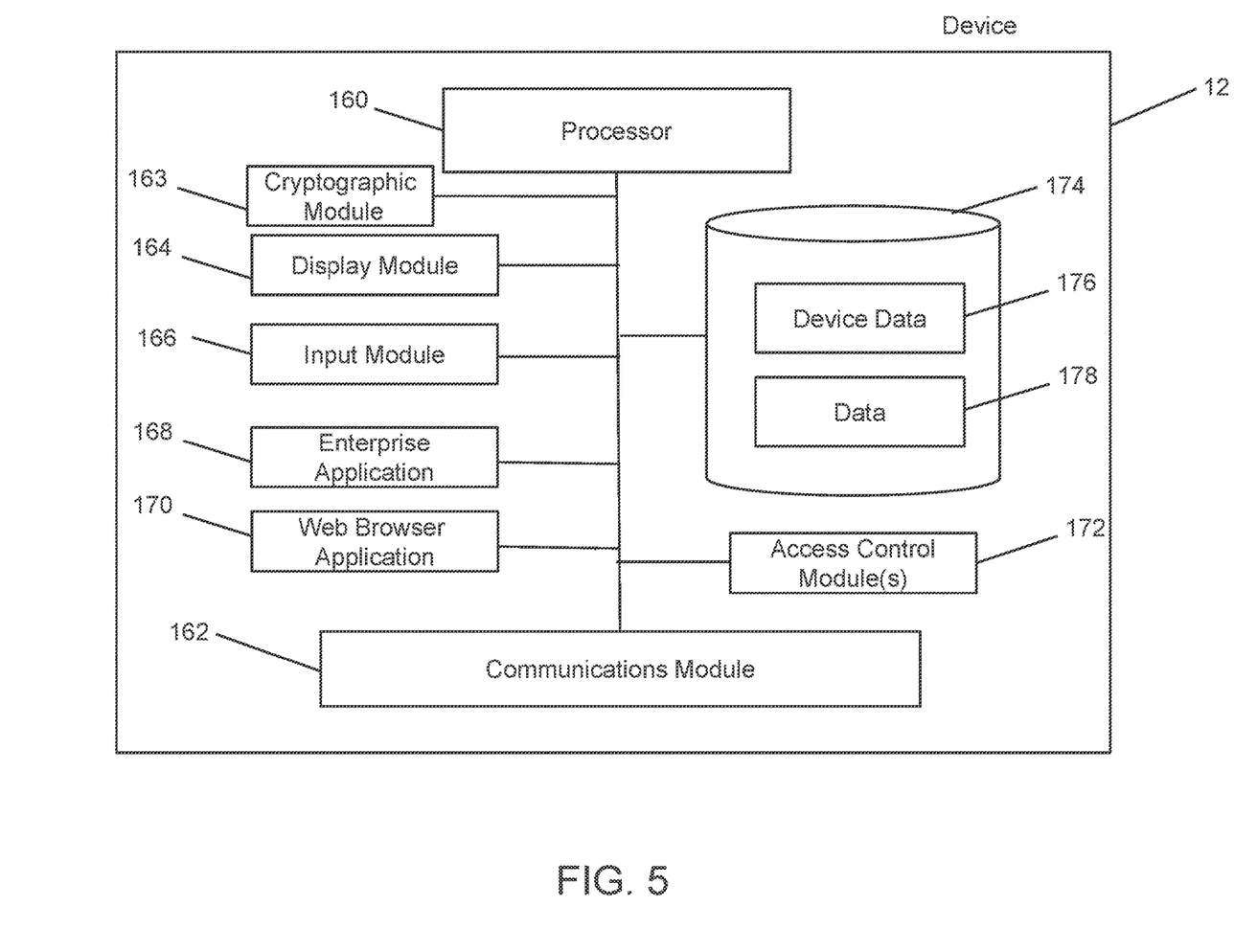
FIG. 5 shows a block diagram of an example configuration of a user device.

In FIG. 5, an example configuration of a device 12 is shown. In certain embodiments, the device 12 may include one or more processors 160, a communications module 162, a cryptographic module 163, and a data store 174 storing device data 176 (e.g., data needed to authenticate with a cloud computing platform 20 or the enterprise platform 16), an access control module 172 similar to the access control module of FIG. 4, and data 178 (e.g., a data model of the common data models 30, or originating raw data that is provided to the raw data layer 28, etc.). Communications module 162 enables the device 12 to communicate with one or more other components of the computing environment 10, such as cloud computing platform 20, or enterprise platform 16, via a bus or other communication network, such as the communication network 14. While not delineated in FIG. 5, similar to the cloud computing platform 20 the device 12 includes at least one memory or memory device that can include a tangible and non-transitory computer-readable medium having stored therein computer programs, sets of instructions, code, or data to be executed by processor 160. FIG. 5 illustrates examples of modules and applications stored in memory on the device 12 and operated by the processor 160. It can be appreciated that any of the modules and applications shown in FIG. 5 may also be hosted externally and be available to the device 12, e.g., via the communications module 162.

In the example embodiment shown in FIG. 5, the device 12 includes a display module 164 for rendering GUIs and other visual outputs on a display device such as a display screen, and an input module 166 for processing user or other inputs received at the device 12, e.g., via a touchscreen, input button, transceiver, microphone, keyboard, etc. The device 12 may also include an enterprise application 168 provided by the enterprise platform 16, e.g., for submitting requests to transfer data from the database 18a to the cloud. The device 12 in this example embodiment also includes a web browser application 170 for accessing Internet-based content, e.g., via a mobile or traditional website and one or applications (not shown) offered by the enterprise platform 16 or the cloud computing platform 20. The data store 174 may be used to store device data 176, such as, but not limited to, an IP address or a MAC address that uniquely identifies device 12 within environment 10. The data store 176 may also be used to store authentication data, such as, but not limited to, login credentials, user preferences, cryptographic data (e.g., cryptographic keys), etc.

It will be appreciated that only certain modules, applications, tools, and engines are shown in FIGS. 3 to 5 for ease of illustration and various other components would be provided and utilized by the cloud computing platform 20, enterprise platform 16, and device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in cloud computing platform 20 or enterprise platform 16, or device 12, or accessible or connectable thereto. Any application or module herein described may be implemented using computer readable/executable instructions that may be stored or otherwise held by such computer readable media.

Figure 6:
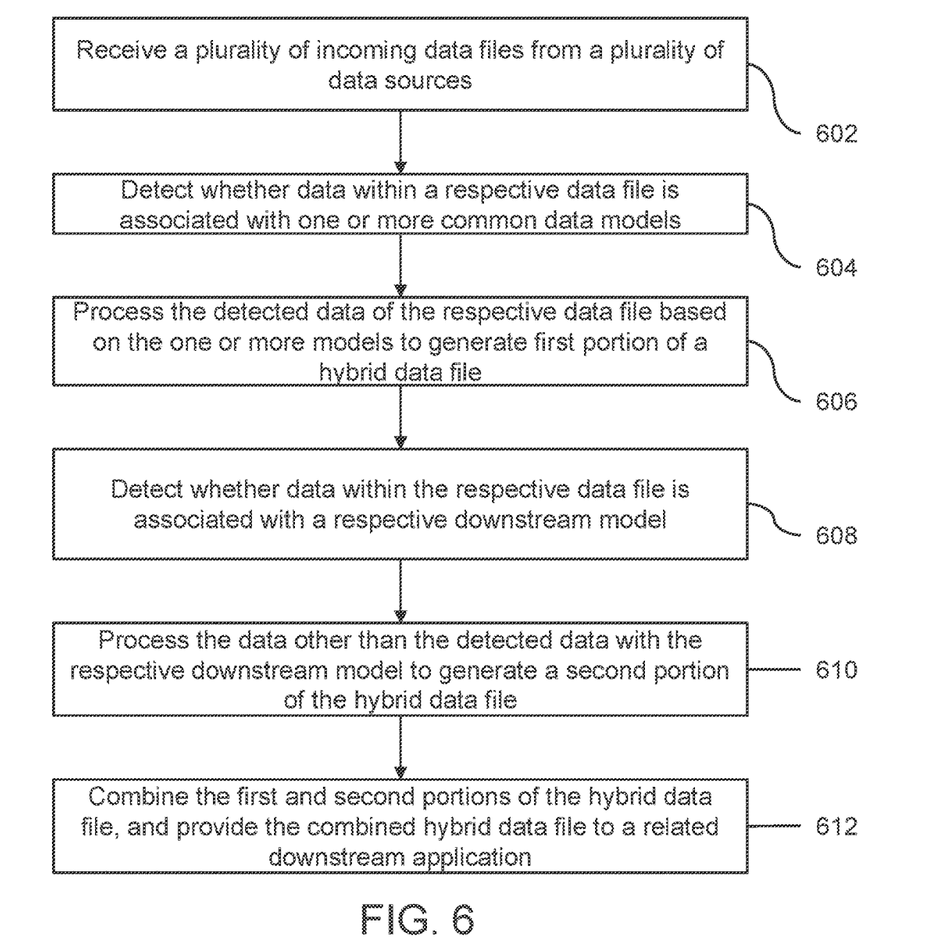
FIG. 6 shows a flow diagram of an example method performed by computer executable instructions for managing data from different data sources.

Referring to FIG. 6, a flow diagram of an example method performed by computer executable instructions (e.g., stored on a memory as described in FIGS. 3-5) for managing data from different data sources is shown. It is understood that the method shown in FIG. 6 may be automatically completed in whole, or only part of the blocks shown therein may be completed automatically (e.g., the functionality of the data manager 22). Furthermore, it is understood that references in FIG. 6 to elements of the preceding figures in this application are illustrative and are not intended to be limiting.

At block 602, a plurality of incoming data files (e.g., data files 26) are received from a plurality of data sources (e.g., the plurality of data sources, as that term is used herein). The data files can be received all at once, in sequence, on request, etc. The data files can each include one or more data entries.

At block 604, each of a plurality of incoming data files (e.g., data files 26) are processed to detect whether data within a respective data file is associated with one or more data models (e.g., common data models 30).

To detect whether the data file is associated with the data models, the method can include querying a centralized linking table (e.g., as described above in relation to FIG. 2) to determine whether one or more data entries of the data file are in a designated format, or whether the respective data file originates from a configured source. For example, the linking table can specify that certain data sources 18 are known to include certain data relevant to the common data model. The linking table can be prepared a least in part by the data steward after reviewing the common data models 30 to ensure that data from the managed source will comply with the common data model.

In at least some embodiments, the one or more linking tables are provided as part of the data manager 22 (e.g., as part of the common data models 30), and the linking tables map data entries in data files to hybrid data entries.

At block 606, for data files that include data that is associated with the one or more common data models, the detected data is processed based on the one or more models (e.g., common data models 30) to generate first portion of a hybrid data file (e.g., hybrid data file 33). For example, the name and date data entries of a data file can be found to be associated with a common data model 30, that those data entries in the data file can be processed to satisfy the common data model 30. That is, the name data entries can be converted into an acceptable data type, the date data can be converted into a particular format, etc.

At block 608, each of the plurality of incoming data files to detect whether data within the respective data file is associated with a respective downstream model (e.g., the customized data model 32). A plurality of downstream models are contemplated, and the respective downstream model can be a model that defines data objects for data other than the detected data of block 604.

At block 610, the detected data of block 608 is processed to generate a second portion of the hybrid data file (e.g., hybrid data file 33). The second portion of the hybrid data file is based on other than the detected data of block 604.

At block 612, the first and second portion of the hybrid data files are combined and provided to a downstream application. The downstream application can be a layer, such as the consumable data layer 34, it can be an application such as web application 170, etc.

It is understood that the sequence shown in FIG. 6 is illustrative, and not limiting. For example, blocks 604 and 608 can occur simultaneously, on different nodes of the remote computing resources.

The data manager 22 (e.g., alone, or in combination with an access control module) can be configured to register users for authorization to manage listing tables or models. For example, the data manager 22 can be used to register data stewards as managers of linking tables associated with their respective data sources. The registration process can include having confirmation from multiple different sources, such as a data scientist responsible for the data manager 22 and another executive associated with the business unit that stewards the data.

The authorized user can update associated linking tables via request or submit requests to have changes or updates implemented. Similarly, a user can register a new data source with the data manager 22 and register as an authorized user to change the new data source listing table. New data sources can be incorporated into existing linking tables, to reduce complexity.

Implementing changes to the common data models 30 can be more restrictive. For example, users not associated with individual data sources (e.g., data management users) can be authorized to change the common data model, to ensure that (1) users with a greater perspective of the whole data management process is required to change the common data model meant to be implemented enterprise wide, and (2) to prevent the common data model from creating conflicts throughout the enterprise through updates. Changes to the common data model 30 can require more than one approval, such as the approval of data steward(s) responsible for the largest amount of data and the data management personnel.

The data manager 22 can also be responsible for notifying downstream applications of changes to the common data model. For example, the data manager 22 can provide update instructions to the related downstream application in response to determining an updated model (e.g., model 30) impacts the related downstream application. The notification can be performed indirectly (e.g., by notifying the data source 18 owners of the new common data definition, which will require the data owners to discuss with the downstream applications), or the data manager 22 can parse the consumption data layer 34 to determine which hybrid data files 33 have been accessed by which applications, etc.

Figure 7:
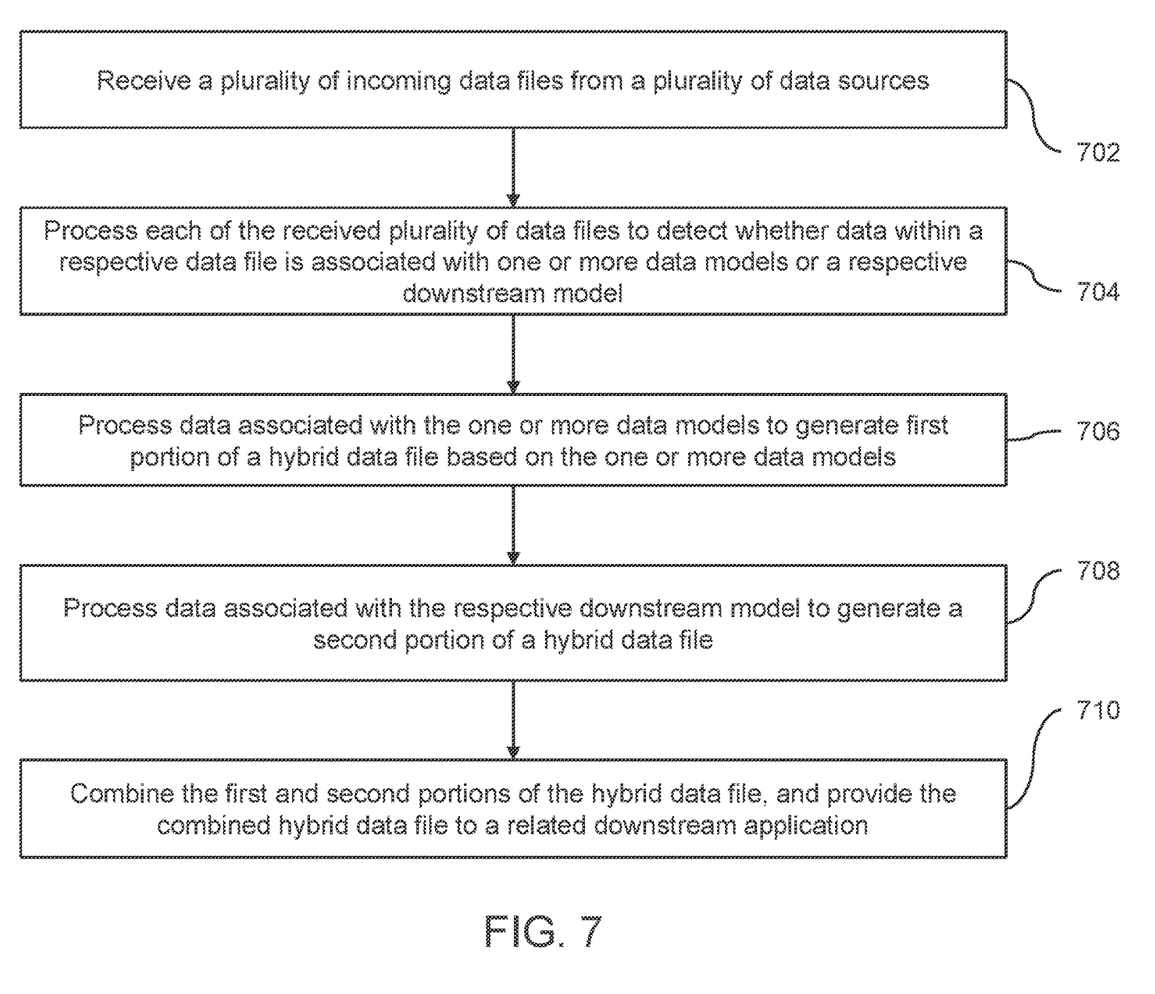
FIG. 7 shows a flow diagram of another example method performed by computer executable instructions for managing data from different data sources.

Referring to FIG. 7, a flow diagram of another example method performed by computer executable instructions (e.g., stored on a memory as described in FIGS. 3-5) for managing data from different data sources is shown. It is understood that the method shown in FIG. 7 may be automatically completed in whole, or only part of the blocks shown therein may be completed automatically (e.g., the functionality of the data manager 22). Furthermore, it is understood that references in FIG. 7 to elements of the preceding figures in this application are illustrative and are not intended to be limiting.

At block 702, similar to block 602, a plurality of data files are received.

At block 704, each of the data files 26 is processed to determine whether data entries therein are responsive to the common data model(s) 30 or the customized data models 32. As each of the models 30, 32 can define mutually exclusive data objects, the process can include the data file 26 being duplicated or sequentially accessed to enable at least in part parallel processing.

At block 706 and 708, data entries that are associated with the models 30, 32 are processed to ensure compliance with the associated model. For example, date data can be reformatted according to a common data model 30, while KPIs can be generated according to the customized data model 32. The processed data entries are used to generate different portions of a hybrid data file.

At block 710, the different portions are combined to form the hybrid data file 33.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for managing data from different data sources, the system comprising:
   a processor;
   a communications module coupled to the processor; and
   a memory coupled to the processor, the memory storing computer executable instructions that when executed by the processor cause the system to:
      store at least one common data model associated with common data, the common data model defining entries used commonly by a plurality of units in an enterprise system;
      store at least one customized data model associated with data other than the common data, the customized data model being independent of the common data model to customize data entries for the other data for a subset of the plurality of units in the enterprise system;
      receive a plurality of data files from a plurality of data sources associated with the plurality of units in the enterprise system;
      process each of the received plurality of data files to detect whether data within a respective data file is common data associated with the at least one common data model or is included in the other data and is associated with one of the customized data models and used with a downstream application;
      process the common data associated with the at least one common data model to generate a first portion of a hybrid data file;
      independently process the other data associated with the customized data models to generate a second portion of a hybrid data file; and
      combine the first and second portions of the hybrid data file and provide the combined hybrid data file to the downstream application.

2. The system of claim 1, wherein, to detect whether data within the respective data file is associated with common or customized data models, the instructions cause the system to:
   query centralized linking tables to determine whether one or more data entries are in a designated format, or whether the respective data file originates from a configured source.

3. The system of claim 1, wherein the instructions cause the system to:
   provide one or more linking tables that map data entries in data files to hybrid data entries, the linking tables being defined on a per source of the plurality of data sources basis.

4. The system of claim 3, wherein the instructions cause the system to:
   authorize a user associated with a data source of the plurality of data sources to access a respective linking table of the one or more linking tables; and
   update the respective linking table in response to a request from the authorized user.

5. The system of claim 3, wherein the instructions cause the system to:
   adjust at least one of the one or more linking tables to incorporate a new data source.

6. The system of claim 1, wherein the instructions cause the system to:
   authorize a data management user associated with a data store itself associated with the common or customized data models to access at least one of the common or customized data models; and
   update the at least one of the common or customized data models in response to a request from the authorized data management user.

7. The system of claim 6, wherein the instructions cause the system to:
   query a user associated with the at least one of the common or customized data models to confirm updates proposed in the request.

8. The system of claim 6, wherein the instructions cause the system to:
   provide updated instructions to the related downstream application in response to determining the updated at least one of the common or customized data models impacts the downstream application.

9. The system of claim 1, wherein at least one of the customize data models defines key performance indicators or assessment metrics.

10. The system of claim 1, wherein data of the data files impacted by the at least one common data model is not impacted by the at least one custom data model.

11. The system of claim 1, wherein the instructions cause the system to generate the first and second hybrid portions in parallel.

12. A method for managing data from different data sources, the method comprising:

storing at least one common data model associated with common data, the common data model defining entries used commonly by a plurality of units in an enterprise system;

storing at least one customized data model associated with data other than the common data, the customized data model being independent of the common data model to customize data entries for the other data for a subset of the plurality of units in the enterprise system;

receiving a plurality of data files from a plurality of data sources associated with the plurality of units in the enterprise system;

processing each of the received plurality of data files to detect whether data within a respective data file is common data associated with the at least one common data model or is included in the other data and is associated with one of the customized data models and used with a downstream application;

processing the common data associated with the at least one common data model to generate a first portion of a hybrid data file;

independently processing the other data associated with the customized data models to generate a second portion of a hybrid data file; and combining the first and second portions of the hybrid data file and provide the combined hybrid data file to the downstream application.

13. The method of claim 12, comprising:
providing one or more linking tables that map data entries in data files to hybrid data entries, the linking tables being defined on a per source of the plurality of data sources basis.

14. The method of claim 13, comprising:
authorizing a user associated with a data source of the plurality of data sources to access a respective linking table of the one or more linking tables; and
updating the respective linking table in response to a request from the authorized user.

15. The method of claim 13, comprising:
adjusting at least one of the one or more linking tables to incorporate a new data source.

16. The method of claim 12, comprising:
authorizing a data management user associated with a data store itself associated with the common or customized data models to access at least one of the common or customized data models; and
updating the at least one of the common or customized data models in response to a request from the authorized data management user.

17. The method of claim 16, comprising:
querying a user associated with the at least one of the common or customized data models to confirm updates proposed in the request.

18. The method of claim 16, comprising:
providing updated instructions to the related downstream application in response to determining the updated at least one of the common or customized data models impacts the downstream application.

19. The method of claim 12, comprising generating the first and second hybrid portions in parallel.

20. A non-transitory computer readable medium for managing data from different data sources, the computer readable medium comprising computer executable instructions for:

storing at least one common data model associated with common data, the common data model defining entries used commonly by a plurality of units in an enterprise system;

storing at least one customized data model associated with data other than the common data, the customized data model being independent of the common data model to customize data entries for the other data for a subset of the plurality of units in the enterprise system;

receiving a plurality of data files from a plurality of data sources associated with the plurality of units in the enterprise system;

processing each of the received plurality of data files to detect whether data within a respective data file is common data associated with the at least one common data model or is included in the other data and is associated with one of the customized data models and used with a downstream application;

processing the common data associated with the at least one common data model to generate a first portion of a hybrid data file;

independently processing the other data associated with the customized data models to generate a second portion of a hybrid data file; and combining the first and second portions of the hybrid data file and provide the combined hybrid data file to the downstream application.

* * * * *